(12) United States Patent
Azevedo et al.

(10) Patent No.: US 10,450,999 B2
(45) Date of Patent: Oct. 22, 2019

(54) REDUCED COMPRESSION HEIGHT DUAL GALLERY PISTON, PISTON ASSEMBLY THEREWITH AND METHODS OF CONSTRUCTION THEREOF

(71) Applicant: TENNECO INC., Lake Forest, IL (US)

(72) Inventors: Miguel Azevedo, Ann Arbor, MI (US); Michael Weinenger, Southfield, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 16/250,125

(22) Filed: Jan. 17, 2019

(65) Prior Publication Data
US 2019/0145345 A1 May 16, 2019

Related U.S. Application Data

(62) Division of application No. 14/981,319, filed on Dec. 28, 2015, now Pat. No. 10,184,422.

(Continued)

(51) Int. Cl.
*F02F 3/22* (2006.01)
*F16C 7/02* (2006.01)
(Continued)

(52) U.S. Cl.
CPC ............. *F02F 3/22* (2013.01); *F02F 3/003* (2013.01); *F02F 3/26* (2013.01); *F16C 7/023* (2013.01);
(Continued)

(58) Field of Classification Search
CPC ...... F02F 3/22; F02F 3/26; F02F 3/003; F02F 3/18; F02F 2003/0007; F02F 2003/0061;
(Continued)

(56) References Cited

U.S. PATENT DOCUMENTS

| 1,763,625 | A | * | 6/1930 | Mellor | ........... | F02F 3/0015 |
| | | | | | | 123/41.38 |
| 2,386,117 | A | * | 10/1945 | Hvid | ........... | F16J 9/08 |
| | | | | | | 123/41.37 |

(Continued)

FOREIGN PATENT DOCUMENTS

| CN | 1143715 A | 2/1997 |
| CN | 101040136 A | 9/2007 |

(Continued)

*Primary Examiner* — Hung Q Nguyen
(74) *Attorney, Agent, or Firm* — Robert L. Stearns; Dickinson Wright, PLLC (57) ABSTRACT

A piston assembly, piston therefor and methods of construction are provided. The assembly includes a piston head and connecting rod operably coupled thereto via a wrist pin. The piston head has an upper crown with a combustion bowl and an undercrown surface. The lower crown includes axially aligned pin bores receiving the wrist pin. An upper wall of the lower crown has an oil inlet, an oil outlet and a concave, saddle bearing surface that bears against the wrist pin. A toroid-shaped outer cooling gallery is formed between wall portions of the upper and lower crowns, wherein the outer cooling gallery surrounds an inner cooling gallery. The connecting rod is fixed to the wrist pin for conjoint oscillation. The connecting rod has an oil passage in fluid communication with a through hole in the wrist pin to allow oil to flow therethrough into the inner cooling gallery via the oil inlet.

10 Claims, 9 Drawing Sheets

Related U.S. Application Data (60) Provisional application No. 62/098,181, filed on Dec. 30, 2014.

(51) Int. Cl.
*F02F 3/00* (2006.01)
*F16J 1/14* (2006.01)
*F02F 3/26* (2006.01)
*F16J 1/09* (2006.01)
*F16J 1/08* (2006.01)
*F02F 3/18* (2006.01)

(52) U.S. Cl.
CPC . *F16J 1/08* (2013.01); *F16J 1/09* (2013.01); *F16J 1/14* (2013.01); *F02F 3/18* (2013.01); *F02F 2003/0007* (2013.01); *F02F 2003/0061* (2013.01)

(58) Field of Classification Search
CPC .......... F16J 1/08; F16J 1/14; F16J 1/09; F16C 7/023
See application file for complete search history.

(56) References Cited

U.S. PATENT DOCUMENTS

| | | | | |
|---|---|---|---|---|
| 2,572,260 A * | 10/1951 | Hall | ............ | F02F 3/22 123/41.38 |
| 2,687,931 A * | 8/1954 | Flynn, Jr. | ............ | F02F 3/003 123/41.35 |
| 2,742,883 A * | 4/1956 | Smith | ............ | F02F 3/22 123/41.38 |
| 2,818,842 A * | 1/1958 | Tromel | ............ | F02F 3/22 123/41.38 |
| 3,240,193 A * | 3/1966 | Ephraim, Jr. | ............ | F02F 3/0076 123/41.35 |
| 3,613,521 A * | 10/1971 | Itano | ............ | F02F 3/003 123/41.35 |
| 3,930,472 A * | 1/1976 | Athenstaedt | ............ | F02B 23/0696 123/41.38 |
| 4,011,797 A * | 3/1977 | Cornet | ............ | F02F 3/003 123/193.6 |
| 4,013,057 A * | 3/1977 | Guenther | ............ | F02B 23/0696 123/193.6 |
| 4,363,293 A | 12/1982 | Munoz et al. | | |
| 4,662,319 A * | 5/1987 | Ayoul | ............ | F02F 3/0015 123/41.35 |
| 4,986,167 A * | 1/1991 | Stratton | ............ | F01P 3/18 123/193.6 |
| 6,477,941 B1 * | 11/2002 | Zhu | ............ | F02F 3/003 92/186 |
| 6,698,391 B1 | 3/2004 | Kemnitz | | |
| 6,862,976 B2 * | 3/2005 | Gaiser | ............ | F02F 3/22 92/186 |
| 7,367,305 B2 * | 5/2008 | Endoh | ............ | F02F 3/0076 123/197.3 |
| 8,065,985 B2 * | 11/2011 | Schneider | ............ | F02F 3/003 123/193.1 |
| 8,267,005 B2 * | 9/2012 | Scharp | ............ | B23P 15/10 92/186 |
| 8,616,114 B2 * | 12/2013 | Ribeiro | ............ | F02F 3/003 29/888.042 |
| 8,789,273 B2 * | 7/2014 | Janssen | ............ | B23K 20/12 29/888.04 |
| 9,127,618 B2 * | 9/2015 | Azevedo | ............ | F16J 1/005 |
| 9,216,474 B2 * | 12/2015 | Wandrie, III | ............ | F02F 3/22 |
| 9,797,337 B2 * | 10/2017 | Nguyen | ............ | F02F 3/0069 |
| 2006/0037471 A1 | 2/2006 | Zhu et al. | | |
| 2010/0275861 A1 * | 11/2010 | Schneider | ............ | F02F 3/003 123/41.35 |
| 2011/0146074 A1 * | 6/2011 | Ribeiro | ............ | F02F 3/003 29/888.044 |
| 2012/0037112 A1 | 2/2012 | Muscas | | |
| 2013/0047948 A1 * | 2/2013 | Heuschmann | ............ | F02F 3/18 123/193.6 |
| 2013/0213340 A1 | 8/2013 | Muscas | | |

FOREIGN PATENT DOCUMENTS

| | | |
|---|---|---|
| CN | 104246191 A | 12/2014 |
| DE | 10244512 A1 | 4/2004 |
| JP | S62162337 U | 10/1987 |
| JP | H10196362 A | 7/1998 |
| WO | 2012161863 A2 | 11/2012 |

\* cited by examiner

REDUCED COMPRESSION HEIGHT DUAL GALLERY PISTON, PISTON ASSEMBLY THEREWITH AND METHODS OF CONSTRUCTION THEREOF

CROSS-REFERENCE TO RELATED APPLICATION

This U.S. Divisional application claims the benefit of U.S. Provisional Application Ser. No. 62/098,181, filed Dec. 30, 2014 and U.S. Utility application Ser. No. 14/981,319, filed Dec. 18, 2015, both of which are incorporated herein by reference in their entirety.

BACKGROUND OF THE INVENTION

1. Technical Field

This invention relates generally to internal combustion engines, and more particularly to pistons and their method of construction.

2. Related Art

Engine manufacturers are encountering increasing demands to improve engine efficiencies and performance, including, but not limited to, improving fuel economy, improving fuel combustion, reducing oil consumption, increasing the exhaust temperature for subsequent use of the heat within the vehicle, increasing compression loads and temperature within the cylinder bores, decreasing weight and making engines more compact. In order to achieve these goals, the size and compression height of the piston need to be reduced, however, the increased temperature and compression loads within the combustion chamber require a robust piston to be maintained within workable thermal and loading limits. As such, although desirable to increase the temperature and compression loads within the combustion chamber, there is a tradeoff in that these increases limit the degree to which the compression height, and thus, overall engine size, can be reduced. Further, the degree to which the weight of the engine can be reduced is compromised in that the increased temperature and load demands placed on the pistons require that they be made robust and of steel.

A piston constructed in accordance with this invention is able to withstand the modern performance demands discussed above, while at the same time having a reduced compression height and reduced weight, as will become apparent to those skilled in the art upon reading the disclosure and viewing the drawings herein.

SUMMARY OF THE INVENTION

A piston constructed in accordance with one aspect of this invention is constructed of steel, thereby providing the piston with enhanced strength and durability to withstand increased compression loads within a cylinder bore, such as those seen in modern high performance engines. To further enhance the strength and rigidity of the piston, a toroid-shaped, outer cooling gallery can include a plurality of circumferentially spaced ribs extending along an undercrown surface, with the ribs extending radially between an outer ring belt region and an inner wall of the outer cooling gallery. Further, to enhance cooling the piston, in addition to the outer cooling gallery, the piston further includes a closed or substantially closed central inner cooling gallery, thereby allowing the piston to withstand elevated temperatures encountered in modern, high performance engines. Further yet, due to the novel configuration of the piston, the compression height (CH) and weight of the piston are able to be minimized, thereby allowing an engine in which the pistons are deployed to be made more compact and lightweight.

In accordance with one aspect of the invention, a piston assembly for an internal combustion engine is provided. The piston assembly includes a piston head with a connecting rod operably coupled thereto via a wrist pin. The piston head has upper and lower crowns, with the upper crown forming an upper combustion surface having a combustion bowl depending therein with an undercrown surface provided opposite the combustion bowl. The upper crown further includes a circumferentially continuous upper outer wall portion forming, at least in part, a ring belt region, and a circumferentially continuous upper inner wall portion depending from the undercrown surface, wherein the upper inner wall portion is spaced radially inwardly from the upper outer wall portion in generally concentric relation therewith. The lower crown depends from the upper crown to form a pair of laterally spaced pin bosses having axially aligned pin bores configured for receipt of a wrist pin. A pair of diametrically opposite skirt portions extend between the pin bosses, and an upper wall of the lower crown has a concave, saddle bearing surface formed therein, with the bearing surface extending between the pin bosses to provide a continuous bearing surface, in combination with the pin bores, that bears against the full length of the wrist pin. The upper wall has at least one oil inlet and at least one oil outlet to facilitate cooling the piston assembly. The lower crown has a circumferentially continuous lower outer wall portion and a circumferentially continuous lower inner wall portion, both extending upwardly from the upper wall, wherein the annular upper and lower outer wall portions are fixed to one another and the annular upper and lower inner wall portions are fixed to one another, thereby forming a torpid-shaped outer cooling gallery surrounding a central inner cooling gallery. The connecting rod has an end fixed to the wrist pin for conjoint oscillation therewith. The wrist pin has a through hole extending generally transversely to its length and the connecting rod has an oil passage aligned for fluid communication with the through hole to allow oil to flow through the connecting rod, through the wrist pin, and through the oil inlet into the inner cooling gallery, whereupon the oil is free to flow outwardly from the inner cooling gallery through the at least one oil outlet.

In accordance with another aspect of the invention, the oil passage is configured for constant fluid communication with the through hole in the wrist pin and for intermittent fluid communication with the oil inlet.

In accordance with another aspect of the invention, the at least one oil outlet is aligned to direct oil directly onto an outer surface of the wrist pin.

In accordance with another aspect of the invention, the at least one oil outlet is aligned substantially tangent to an outer surface of the wrist pin to facilitate lubricating the wrist pin.

In accordance with another aspect of the invention, the at least one oil outlet can be provided to include a pair of oil outlets formed on opposite sides of the pin bore axis from one another, wherein each of the pair of oil outlets are configured to direct oil directly onto opposite sides of the wrist pin to enhance lubrication of the wrist pin within the wrist pin bores.

In accordance with another aspect of the invention, the oil inlet is aligned along a central longitudinal axis along which the piston reciprocates to facilitate providing intermittent alignment with the through opening in the wrist pin as the wrist pin oscillates.

In accordance with a further aspect of the invention, a plurality of radially extending reinforcement ribs can be provided to extend along the undercrown surface within the outer cooling gallery, wherein the reinforcement ribs are spaced from the upper wall of the lower crown.

In accordance with another aspect of the invention, the outer cooling gallery can be formed with or without reinforcement ribs along the undercrown surface.

In accordance with a further aspect of the invention, the upper wall forms substantially flat floor in the central cooling gallery to facilitate reducing the compression height of the piston.

In accordance with a further aspect of the invention, the upper wall forms a substantially flat floor in the annular outer cooling gallery to facilitate reducing the compression height of the piston.

In accordance with another aspect of the invention, the upper crown and the lower crown can be joined to one another via friction welding or induction welding.

In accordance with another aspect of the invention, the upper crown and the lower crown can be formed as a monolithic piece of material in a casting process.

In accordance with another aspect of the invention, a piston for an internal combustion engine is provided. The piston includes a piston head having upper and lower crowns, with the upper crown forming an upper combustion surface having a combustion bowl depending therein with an undercrown surface opposite the combustion bowl. The upper crown further includes a circumferentially continuous upper outer wall portion forming, at least in part, a ring belt region, and further includes a circumferentially continuous upper inner wall portion depending from the undercrown surface, wherein the upper inner wall portion is spaced radially inwardly from the upper outer wall portion in generally concentric relation therewith. The lower crown depends from the upper crown to form a pair of laterally spaced pin bosses having axially aligned pin bores for receipt of a wrist pin. A pair of diametrically opposite skirt portions extend between the pin bosses, and an upper wall of the lower crown has a concave, saddle bearing surface extending between the pin bosses to provide a continuous bearing surface, in combination with the pin bores, that is configured to bear against the full length of the wrist pin. The lower crown has a circumferentially continuous, annular lower outer wall portion and a circumferentially continuous, annular lower inner wall portion, both extending upwardly from the upper wall of the lower crown. The upper and lower outer annular wall portions are fixed to one another and the upper and lower inner annular wall portions are fixed to one another, thereby forming a torpid-shaped outer cooling gallery surrounding an inner cooling gallery. At least one oil inlet extends through the saddle bearing surface into the inner cooling gallery such that is it substantially covered by the wrist pin during use. At least one oil outlet extends through the upper wall in generally tangential relation with the saddle bearing surface such that oil from the inner cooling gallery is permitted to flow outwardly from the central cooling gallery onto the wrist pin.

In accordance with a further aspect of the invention, the at least one oil outlet includes a pair of oil outlets formed on opposite sides of the pin bore axis from one another to facilitate lubricating the saddle bearing surface.

In accordance with a further aspect of the invention, the at least one oil inlet is aligned along a central longitudinal axis along which the piston reciprocates.

In accordance with a further aspect of the invention, the piston can further include a plurality of reinforcement ribs extending radially along the undercrown surface within the outer cooling gallery.

In accordance with a further aspect of the invention, the upper crown and the lower crown can be joined to one another by a weld joint.

In accordance with a further aspect of the invention, the upper crown and the lower crown can be formed as a monolithic piece of material in a casting process.

In accordance with a further aspect of the invention, the upper wall forms a substantially flat floor in the central cooling gallery to facilitate reducing the compression height of the piston.

In accordance with a further aspect of the invention, the upper wall forms a substantially flat floor in the annular outer cooling gallery to facilitate reducing the compression height of the piston.

In accordance with another aspect of the invention, a method of constructing a piston assembly for an internal combustion engine is provided. The method includes forming a piston head and operably coupling a connecting rod thereto via a wrist pin. The method includes forming the piston head having upper and lower crowns, with the upper crown forming an upper combustion surface having a combustion bowl depending therein with an undercrown surface opposite the combustion bowl. The method includes forming the upper crown having a circumferentially continuous upper outer wall portion forming, at least in part, a ring belt region, and a circumferentially continuous upper inner wall portion depending from the undercrown surface. The method further includes forming the lower crown depending from the upper crown to form a pair of laterally spaced pin bosses having axially aligned concave pin bores for receipt of a wrist pin. Further, forming a pair of diametrically opposite skirt portions extending between the pin bosses and an upper wall having a concave, saddle bearing surface extending between the pin bosses to provide a continuous bearing surface, in combination with the pin bores, that bears against the full length of the wrist pin. Further yet, forming at least one oil inlet opening and at least one oil outlet opening through the saddle bearing surface. Further yet, forming the lower crown having a circumferentially continuous lower outer wall portion and a circumferentially continuous lower inner wall portion, both extending upwardly from the upper wall, and fixing the upper and lower outer annular wall portions to one another and fixing the upper and lower inner annular wall portions to one another, thereby forming a toroid-shaped outer cooling gallery surrounding an inner cooling gallery. Further, fixing an end of the connecting rod to the wrist pin for conjoint oscillation therewith, and bringing an oil passage in the connecting rod into fluid communication with a through hole in the wrist pin, wherein the through hole in the wrist pin is brought into fluid communication with the at least one oil inlet in the upper wall during reciprocation of the wrist pin against the saddle bearing surface.

In accordance with another aspect of the invention, the method can further include configuring the oil passage in the connecting rod in constant fluid communication with the through hole in the wrist pin and for intermittent fluid communication with the at least one oil inlet in the upper wall.

In accordance with another aspect of the invention, the method can further include aligning the at least one oil outlet to direct oil directly onto an outer surface of the wrist pin.

In accordance with another aspect of the invention, the method can further include aligning the at least one oil outlet in substantially tangent relation to an outer surface of the wrist pin.

In accordance with another aspect of the invention, the method can further include forming the at least one oil outlet as a pair of oil outlets on opposite sides of the pin bore axis from one another.

In accordance with another aspect of the invention, the method can further include aligning the at least one oil inlet along a central longitudinal axis along which the piston reciprocates.

In accordance with another aspect of the invention, the method can further include forming a plurality of radially extending reinforcement ribs along the undercrown surface within the outer cooling gallery, wherein the reinforcement ribs are spaced from the upper wall of the lower crown.

In accordance with another aspect of the invention, the method can further include forming the inner cooling gallery with or without reinforcement ribs along the undercrown surface.

In accordance with another aspect of the invention, the method can further include joining the upper crown and the lower crown to one another via friction welding or induction welding.

In accordance with another aspect of the invention, the method can further include forming the upper crown and the lower crown as a monolithic piece of material in a casting process.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
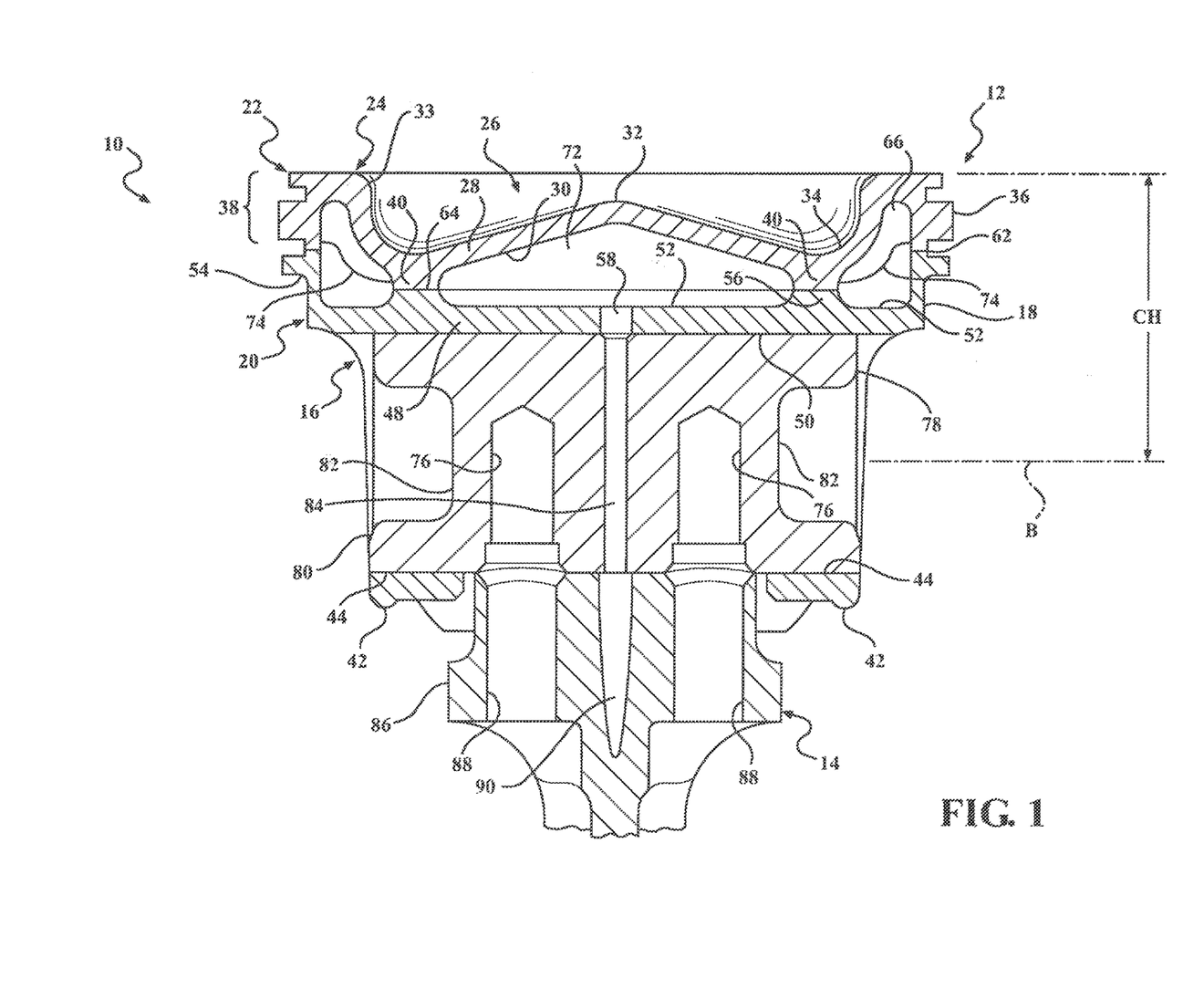
FIG. 1 is a sectioned side view taken generally along a pin bore axis of a piston and connecting rod assembly constructed in accordance with one aspect of the invention.
Figure 2:
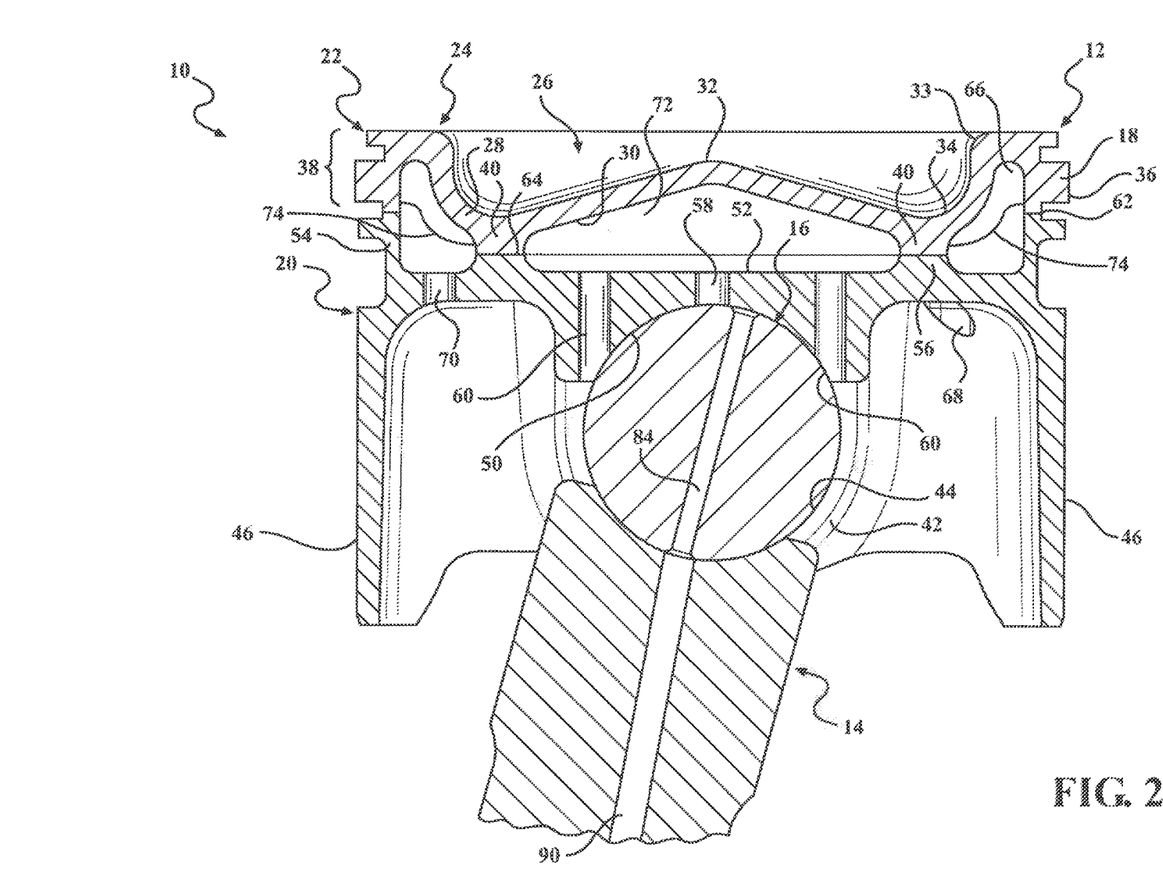
FIG. 2 is a sectioned side view taken generally transversely to the pin bore axis of the piston and connecting rod assembly of FIG. 1.
Figure 3:
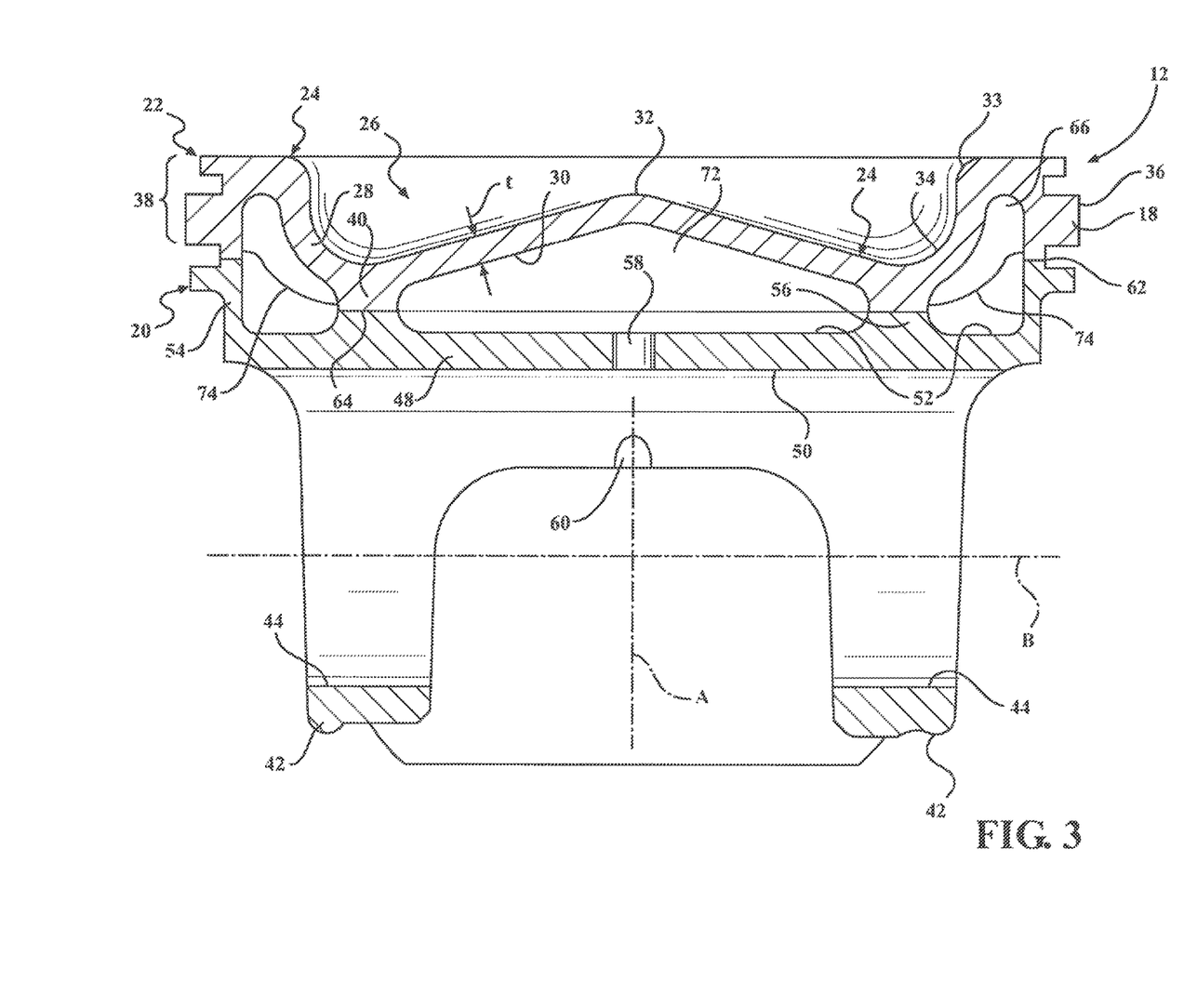
FIG. 3 is a sectioned side view of the piston of FIG. 1 taken generally along the pin bore axis.
Figure 4:
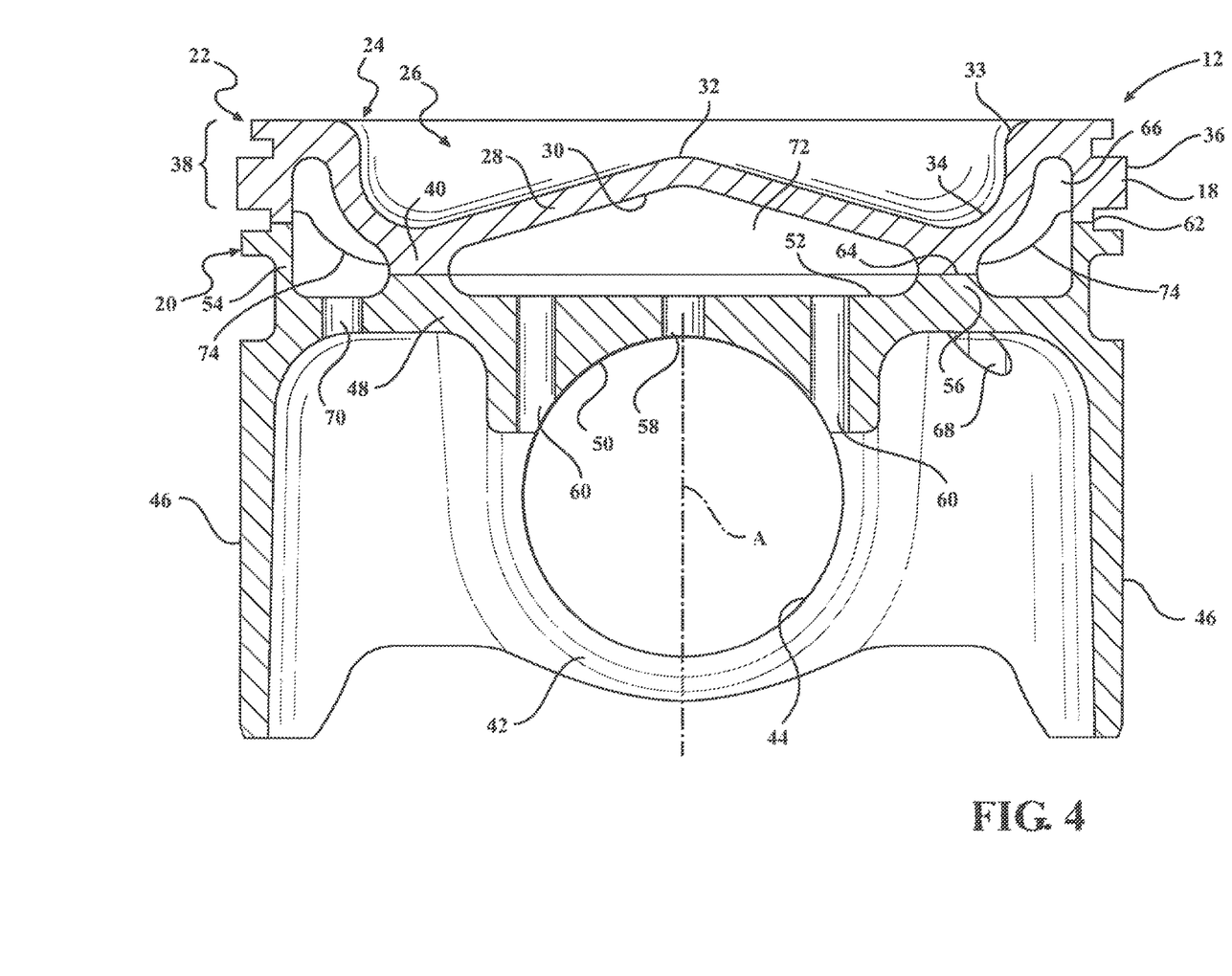
FIG. 4 is a sectioned side view of the piston of FIG. 1 taken generally transversely to the pin bore axis.

Referring in more detail to the drawings, FIG. 1 illustrates a piston and connecting rod assembly, referred to hereafter as assembly 10, constructed in accordance with one presently preferred embodiment of the invention, for reciprocating movement in a cylinder bore or chamber (not shown) of an internal combustion engine, such as a modern, compact, high performance vehicle engine, such as a gas or diesel engine for example. The assembly 10 includes a piston 12, a connecting rod 14 and a wrist pin 16. The connecting rod 14 is operably connected to the piston 12 via fixed attachment to the wrist pin 16 for conjoint oscillation with the wrist pin 16, such as via a threaded fastener or fasteners, by way of example and without limitation. The piston 12 has a body 18, shown in FIGS. 1-4 as being made of two separate pieces that are initially fabricated as separate parts and subsequently joined to one another within a head region across some form of a weld joint (i.e., induction weld, friction weld, braze joint, charge carrier rays, laser, resistance, and the like). The two parts comprise a lower crown, also referred to as bottom part 20, and an upper crown, also referred to as top part 22. Reference to "top", "bottom", "upper" and "lower" herein are relative to the piston 12 being oriented along a vertical longitudinal central piston axis A along which the piston 12 reciprocates in use. This is for convenience and is not to be limiting since it is possible that the piston 12 may be installed and operate at an inclination other than purely vertical. The material (i.e., steel alloy) used to construct the bottom and top parts 20, 22 may be the same (e.g., SAE 1040 grade) or different, depending on the requirements of the piston 12 in the intended engine application. The top part 22 may be cast, may be machined from stock, may be sintered, forged or made by any number of processes. The bottom and top parts 20, 22, being constructed of steel, provide the piston 12 with enhanced strength and durability to withstand increased temperature and compression loads within the cylinder bore, and due to their novel configuration, along with the wrist pin 16 and connecting rod 14, minimize the weight and compression height CH (identified in FIG. 1 as the distance extending between a pin bore axis B and an upper combustion surface 24) of the piston 12, thereby allowing an engine in which the pistons 12 are deployed to achieve enhanced performance and attain a reduced weight and to be made more compact.

A head region of the piston 12 has an annular top wall, also referred to the upper combustion surface 24, with a central combustion bowl 26 depending therein. The combustion bowl 26 is demarcated by a wall 28 having a thickness (t, shown on FIG. 3), wherein the thickness (t) extends between the upper combustion surface 24 and an undercrown surface 30 of the wall 28. The contour of the combustion bowl 26 is formed as being contoured to provide an upper apex or center peak 32 that may lie coaxially along a central axis A of the piston 12 or may be radially offset relative to the piston central axis A. The contour of the combustion bowl wall 28 also provides an annular valley 34 which surrounds the peak 32, shown as being concentric in relation to the peak 32 and forming the lowest portion of the combustion bowl 26. The wall 28 of the combustion bowl 26 extends upwardly from the valley 34 to form a combustion bowl rim 33, which typically is where the greatest heat is generated during use.

The top part 22 of the piston 10 further includes a circumferentially continuous, annular upper outer wall portion 36 forming, at least in part, a ring belt 38, and further includes a circumferentially continuous, annular upper inner wall portion, also referred to as upper inner ring 40, depending from the undercrown surface 30, wherein the upper inner ring 40 is spaced radially inwardly from the upper outer wall portion 36 in generally concentric relation therewith. The ring belt 38 has a plurality of ring grooves in which piston rings (not shown) are received.

The bottom part 20 depends from the upper part 22 to form a pair of laterally spaced pin bosses 42 having axially aligned concave pin bores 44 aligned along the pin bore axis B that extends transversely to the central longitudinal axis A for receipt of the wrist pin 16. A pair of diametrically opposite skirt portions 46 extend between the pin bosses 42, and a planar or substantially planar upper wall 48 of the lower crown 20 has an arcuate, concave, saddle-shaped bearing surface, also referred to as saddle bearing surface 50, extending between the pin bosses 42 to provide a continuous bearing surface in combination with the pin bores 44, wherein the combined bearing surface bears against the full length of the wrist pin 16. The upper wall 48 of the bottom part 20 forms a planar or substantially planar upper surface 52, also referred to as floor 52 (FIG. 3), extending across an upper region of the bottom part 20. The bottom part 20 has a circumferentially continuous, annular lower outer wall portion 54 and a circumferentially continuous, annular lower inner wall portion 56, both extending upwardly from the upper surface 52 in generally concentric relation with one another.

To facilitate cooling the piston 12 and lubricating the wrist pin 16, the upper wall 48 has at least one, and shown as a plurality of openings, shown as having at least one oil inlet, also referred to as port or opening 58 and at least one drainage opening, also referred to as oil outlet, port or opening 60. The oil inlet 58 is shown as extending along the central axis A, and the oil outlets 60 are shown as extending tangentially or substantially tangentially with an outer surface of the wrist pin 16 and the saddle bearing surface 50. The oil inlet 58 and oil outlets 60 are shown as being aligned with one across the width of the wrist pin 16, though it is contemplated the oil outlets 60 could be staggered or formed elsewhere along the length of the wrist pin 16, preferably remaining tangential or substantially tangential therewith. Accordingly, oil flowing through the oil outlets 60 cool and lubricate the wrist pin 16 and the respective saddle bearing surface 50 and pin bores 44.

Figure 6:
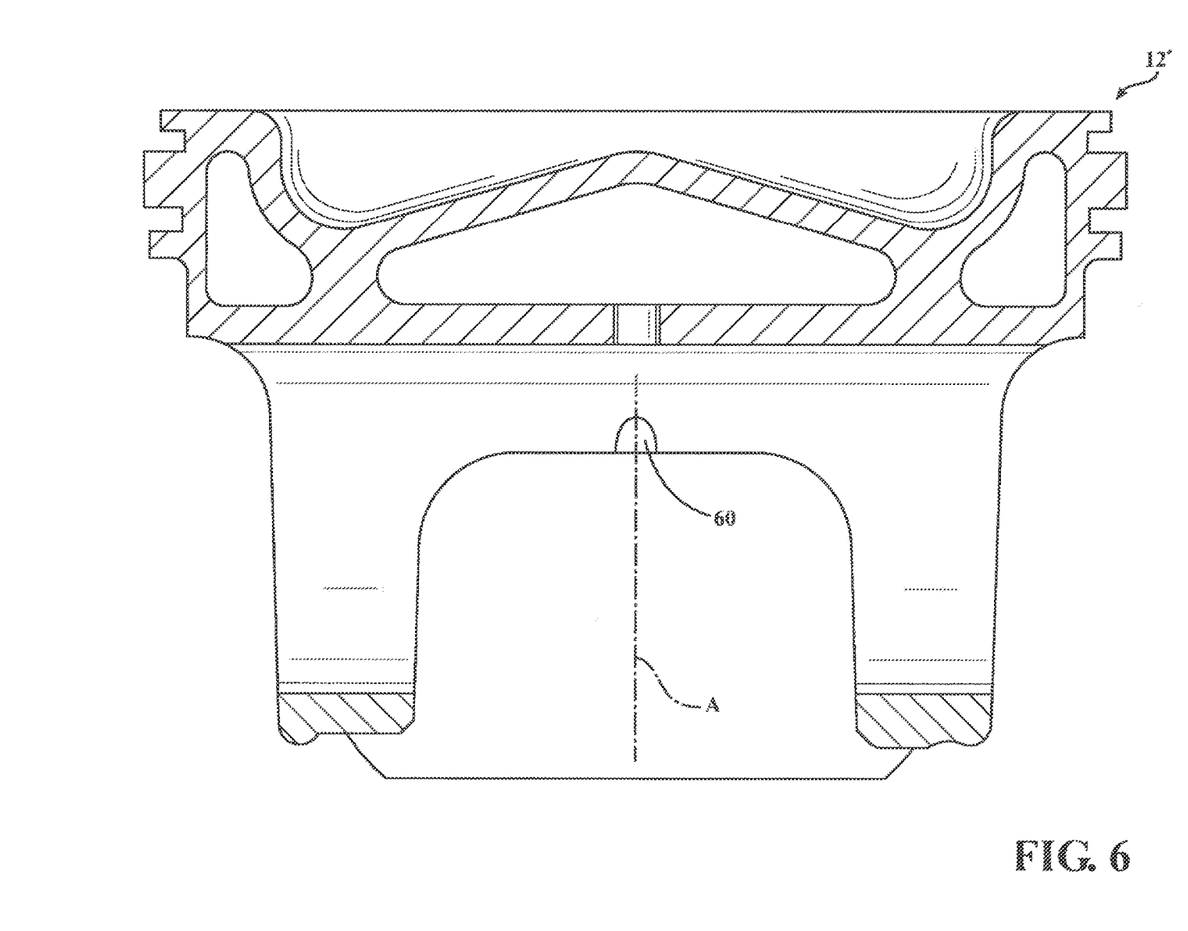
FIG. 6 is a view similar to FIG. 3 of a piston constructed in accordance with another aspect of the invention.
Figure 7:
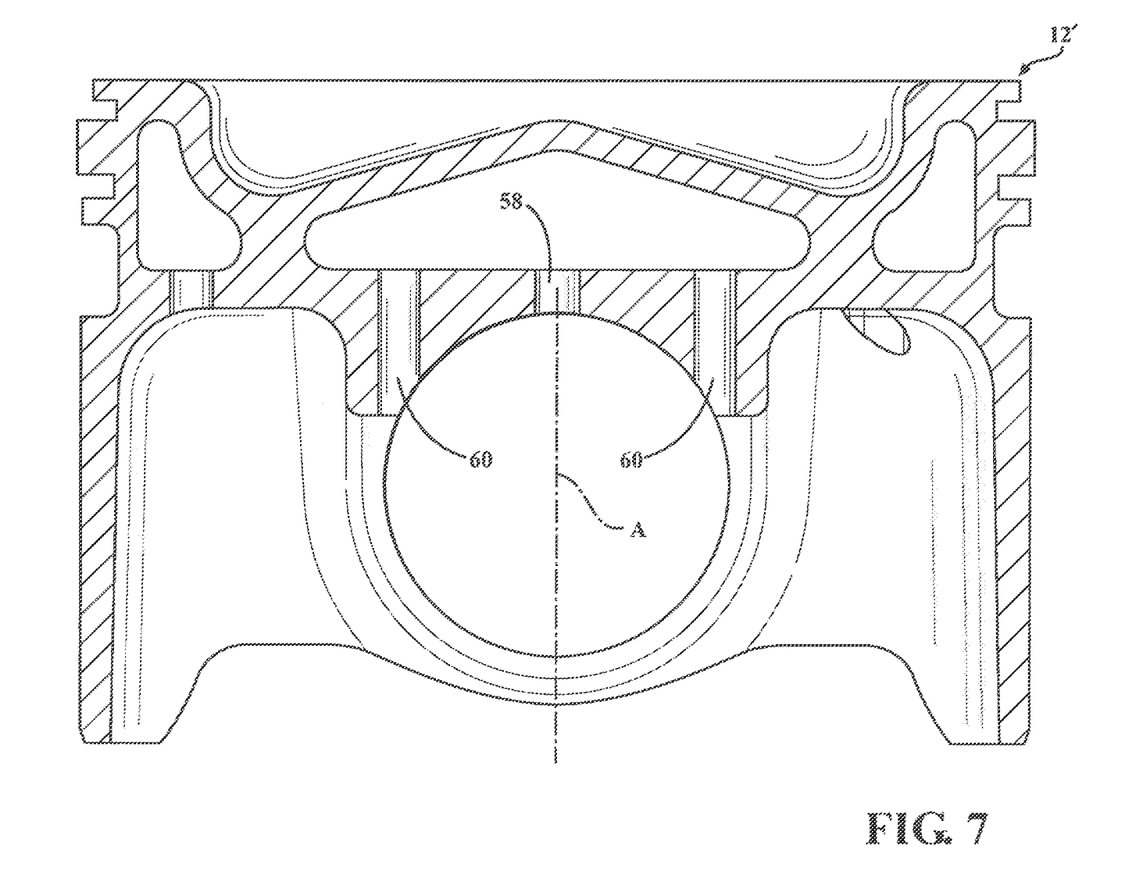
FIG. 7 is a sectioned side view of the piston of FIG. 6 taken generally transversely to the pin bore axis.

An outer weld joint 62 that joins the separately made top and bottom parts 22, 20 of the piston 12 is formed between an annular first lower joining surface of the lower outer wall portion 54 of the bottom part 20 and an upper first joining surface of the upper outer wall portion 36 of the top part 22. Further, an inner weld joint 64 is formed between a second upper joining surface of the lower inner wall portion 56 of the bottom part 20 and a second upper joining surface of the upper inner wall portion 40 of the top part 22. It should be recognized that the first weld joint 62 can be formed in other locations within the ring belt 38 by changing the respective lengths of the outer wall portion 36 and lower outer wall portion 54. Further yet, as shown in an alternate embodiment in FIGS. 6 and 7, a piston 12' constructed in accordance with another aspect of the invention can be constructed in a casting process as a monolithic piece of material without having to join separate parts to one another. Substantially the same features as already discussed about for the piston 12 are shown in FIGS. 6 and 7, and thus, no further discussion is believed necessary.

Figure 5:
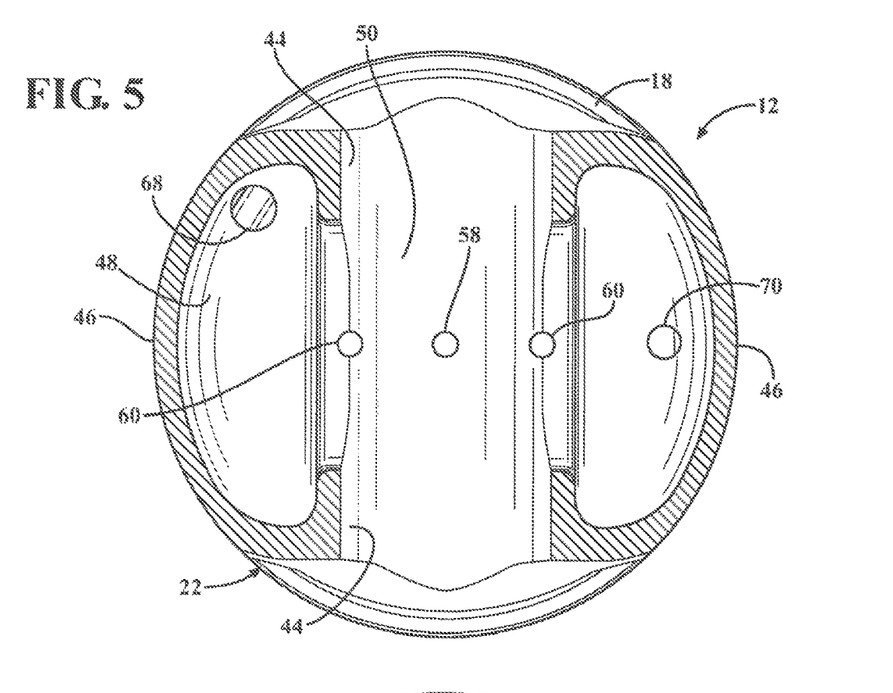
FIG. 5 is a sectioned bottom view of the piston of FIG. 1 taken generally through the pin bore axis.
Figure 8:
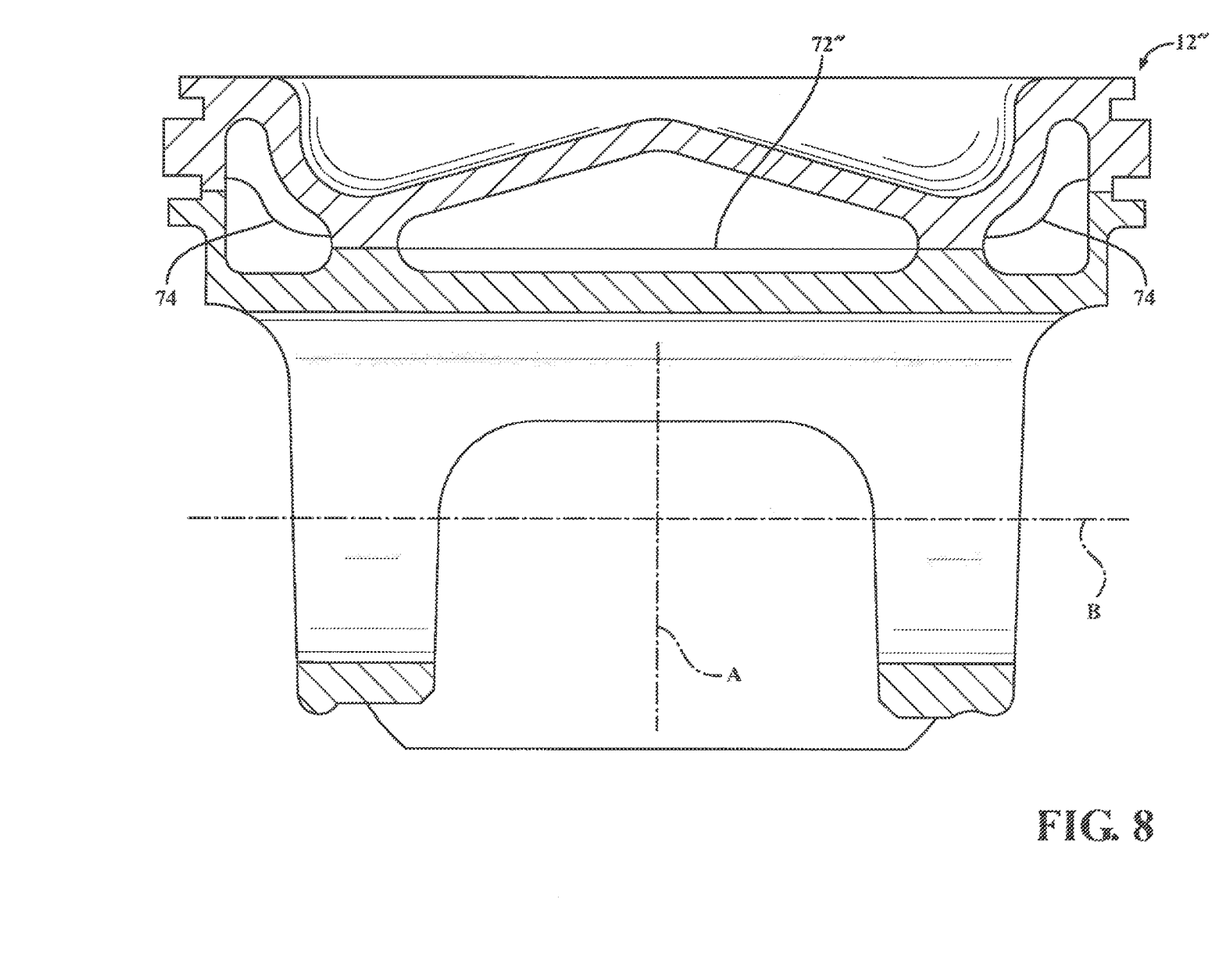
FIG. 8 is a view similar to FIG. 3 of a piston constructed in accordance with yet another aspect of the invention.
Figure 9:
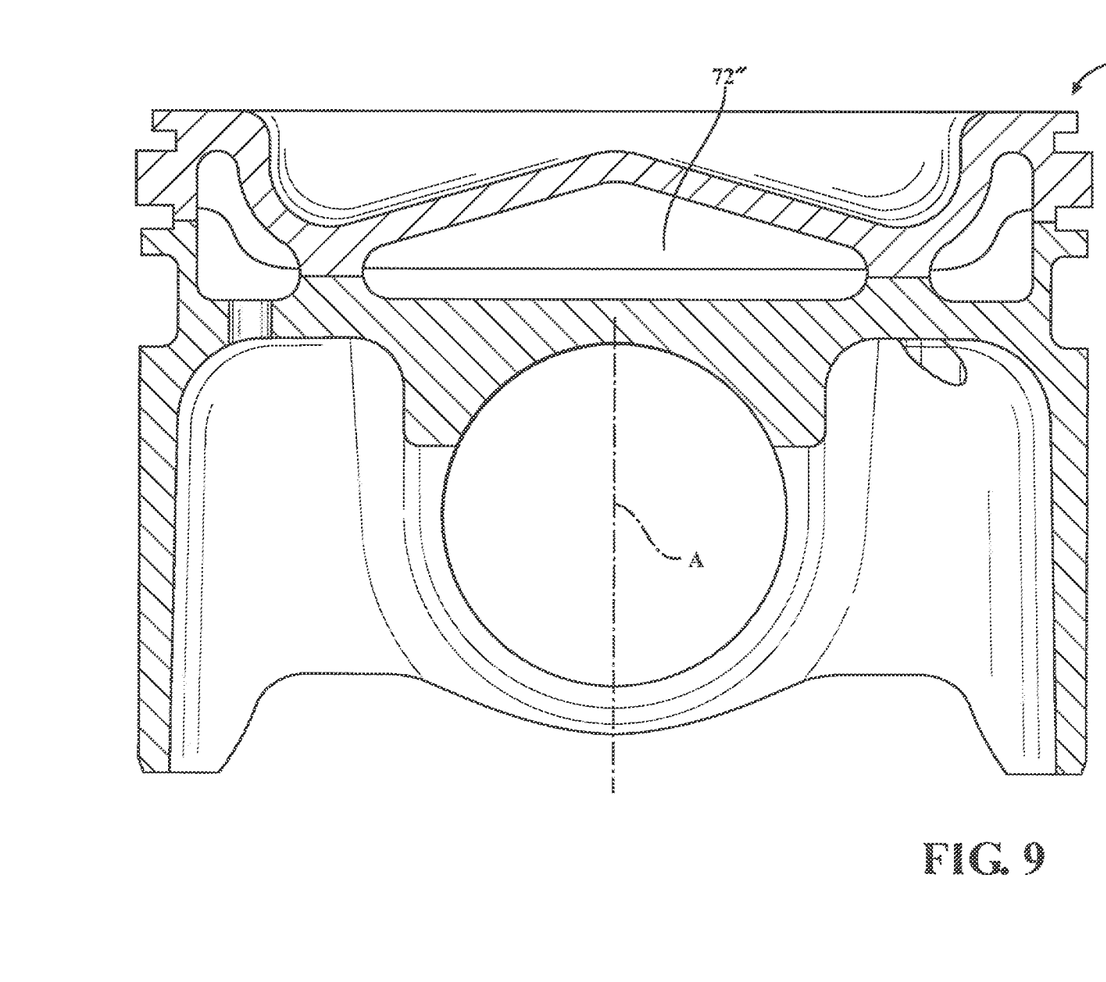
FIG. 9 is a sectioned side view of the piston of FIG. 8 taken generally transversely to the pin bore axis.
Figure 10:
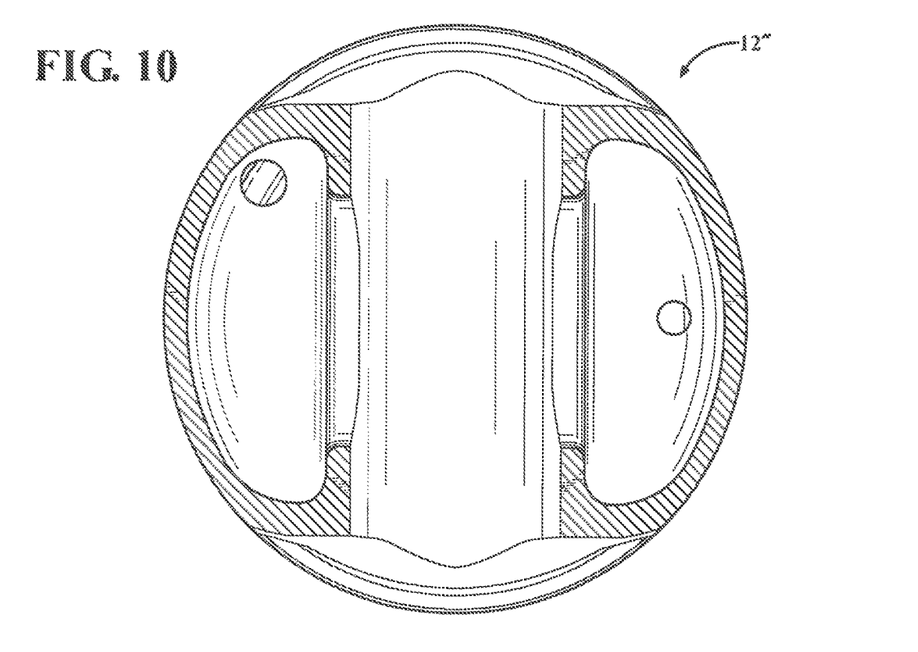
FIG. 10 is a sectioned bottom view of the piston of FIG. 8 taken generally through the pin bore axis.

Upon fixing the bottom and top parts 20, 22 to one another, a substantially closed, toroid-shaped outer cooling gallery 66 is formed adjacent the ring belt 38, wherein an oil inlet or opening 68 (FIGS. 2, 4, and 5) extends through the upper wall 48 of the bottom part 20 into the outer cooling gallery 66 to allow oil to be sprayed therein, such as via an oil jet, by way of example and without limitation. Also, an oil outlet or opening 70 extends through the upper wall 48 of the bottom part 20 on a generally diametrically opposite side of the piston, though slightly offset, to allow oil to exit the outer cooling gallery 66. In addition, an inner, central cooling gallery 72 is formed radially inwardly from the outer cooling gallery 66, wherein the inner cooling gallery 72 has a vaulted, generally conical upper surface formed by the undercrown surface 30 and a flat, planar floor formed by the upper surface 52 of the bottom part upper wall 48, and can be formed as a substantially closed cooling gallery, having only the inlet and outer openings 58, 60. Otherwise, as shown in an alternate embodiment in FIGS. 8-10, a piston 12" constructed in accordance with another aspect of the invention can be formed having a completely closed, sealed inner cooling gallery 72". If constructed as a sealed cooling gallery, a coolant, such as in the form of a metal-containing coolant composition, by way of example and without limitation, can be sealed within the cooling gallery 72". If provided as a metal-containing composition, the coolant material may be disposed into the cooling gallery 72" in the form of a solid, liquid, or a mixture of solid particles and liquid. With the inner cooling gallery 72" containing a coolant medium sealed therein, the heat generated by the piston in the ring belt region does not have a thermal effect on the coolant medium, and thus, the sealed coolant medium can impart an increased cooling effect on the upper combustion surface 24, while the oil coolant circulating through the outer cooling gallery 66 can more efficiently cool the ring belt region. Otherwise, the sealed inner cooling gallery 72" could be void of any cooling medium, other than air, wherein it is to be recognized that the sealed air acts as an insulator, thereby keeping the underlying saddle bearing surface and the wrist pin from overheating.

In accordance with a further aspect of the invention, the top part 22 can be formed having radially extending ribs 74, wherein the ribs 74 extend between the inner wall portion 40 and the outer wall portion 36. The ribs 74 can be provided in any desired number, and are preferably spaced equidistantly from one another about the circumference of the piston, thereby forming a "spoke-like" appearance extending radially outwardly away from the axis A. In one embodiment, the ribs 74 are spaced 60 degrees from one another, thereby having 6 ribs, though other arrangements and numbers or ribs are contemplated herein. The ribs 74 are shown as extending downwardly from the undercrown surface 30 and stopping short of the upper surface 52 of the bottom part 20, thereby allowing oil to flow freely beneath the ribs 74. Accordingly, the ribs 74 do not substantially impede the flow of the oil from circulating throughout the outer cooling gallery 66 between the inlet opening 68 and outlet opening 70. The presence of the ribs 74, although relatively short and robust, greatly increases the compression load able to be withstood by the piston, wherein testing has shown that the amount of compression load able to be withstood increases by about 40 percent or more. In one exemplary test, the compression load of the piston increased from about 180 bar (without ribs 74) to about 250 bar (with ribs 74).

The wrist pin 16 has at least one, and shown as a pair of threaded openings 76 for receipt of fasteners (not shown) to fix the connecting rod 14 to the wrist pin 16. Accordingly, the wrist pin 16 and the connecting rod 14 are fixed against relative movement with one another. The wrist pin 16 further includes opposite ends 78, 80 having pockets or recesses 82 extending therein, thus, further reducing the weight of the piston assembly 10 and moment of inertia thereof in use. Further contributing to a weight reduction is an oil hole, also referred to as through hole 84, extending along a widthwise direction midway between the threaded openings 76 that allows oil to flow therethrough, thus, enhancing cooling and lubrication of the wrist pin 16 in use. Further yet, with the full length of the wrist pin 16 bearing against the pin bores 44 and the saddle bearing surface 50, the diameter of the wrist pin 16 can be substantially reduced, as the wrist pin 16 is support over its full length and not in cantilevered fashion during a compression or exhaust stroke. Accordingly, the reduction in diameter of the wrist pin 16 further reduces the weight of the assembly 10, while at the same time being able to withstand increased firing pressures relative to conventional cantilevered wrist pin designs.

The connecting rod 14 extends over a length between a large end (not shown) with configured for coupling to a journal of a crankshaft (not shown) and an opposite small end 86 that is configured for fixed attachment to the wrist pin 16. The end 86 has a flange with a pair of through openings 88 configured for alignment with the threaded openings 76 in the wrist pin 16. With the through openings 88 aligned with the threaded openings 76, the fasteners are inserted through the through openings 88 and threaded into the threaded openings 76 to fix the connecting rod 14 to the wrist pin 16. The connecting rod 14 has an oil passage 90 extending over its length, and to avoid interfering with the large end (not shown), the oil passage 90 is inclined relative a longitudinal central axis of the connecting rod 14, and thus, although being configured for fluid communication with the through opening 84 of the wrist pin 16, the oil passage 90 and through opening 84 are inclined relative to one another. Accordingly, the oil passage 90 is aligned with the through hole 84 in the wrist pin 16, and as such, allows oil to flow freely through the connecting rod 14, through the wrist pin 16, through the inlet opening 58 into the central cooling gallery 72, whereupon the oil can drain freely from the central cooling gallery 72 through the outlet openings 60. As such, the wrist pin 16 is cooled and lubricated, while also cooling the combustion bowl wall 28 via the central cooling gallery 72.

The piston 10 is adapted for use in light, modern, high performance vehicle diesel engine applications. While made of steel, the piston 10, by its thin-walled design, is as light, if not lighter, than its aluminum counterparts when taking into account the mass of the aluminum piston and the associated insert pin bore bushings, etc used in aluminum piston assemblies. The steel piston 10 also has a significantly smaller compression height CH. The comparable weight and smaller CH allows the engine to be made smaller and more compact. The greatly reduced CH is made possible by synergistic features, including the reduced diameter wrist pin 16, the raised location of the saddle-shaped uppermost wrist pin saddle bearing surface 50 against which the wrist pin 16 oscillates, the relatively low profile configuration of the cooling galleries 66, 72, due in part to the flat or substantially flat floor surface 52, and the fixation of the connecting rod end 86 directly to the wrist pin 16 without having to wrap around the wrist pin 16.

As a result of the reduced CH and overall envelop of the piston 12, the full length of the connecting rod 14 can be extended by the same or about the same length as the reduction in CH. However, if desired, the same center-to-center relation of a standard connecting rod can be attained by reducing the crank-to-deck face height, thereby reducing the engine block weight and envelope of the engine. Otherwise, the length of the connecting rod 14 can be extended, which in turn, results in a reduced angularity of oscillation over a full stroke, and thus, reduces the thrust load imparted on the skirt panels 46. This also results in a reduction of impact losses stemming from the translation of the piston from one side of the liner to the other, thereby reducing liner cavitation. Further, with the length of the connecting rod being increased, an increase in thermal efficiency is attained due to the added residence time per crank angle spent by the piston 12 close to top-dead-center (TDC) during combustion, thereby increasing the efficiency of conversion into brake power.

Obviously, many modifications and variations of the present invention are possible in light of the above teachings. It is, therefore, to be understood that within the scope of the appended claims, the invention may be practiced otherwise than as specifically described.

What is claimed is:

1. A method of constructing a piston assembly for an internal combustion engine, comprising:
   forming a piston head having upper and lower crowns;
   forming the upper crown having an upper combustion surface having a combustion bowl depending therein with an undercrown surface opposite the combustion bowl;
   forming an annular upper outer wall portion and an annular upper inner wall portion depending from the undercrown surface;
   forming a pair of laterally spaced pin bosses depending from an upper wall of the lower crown and having axially aligned pin bores for receipt of a wrist pin;
   forming a pair of diametrically opposite skirt portions extending between the pin bosses;
   forming a concave, saddle bearing surface extending between the pin bosses in the upper wall of the lower crown;
   forming at least one oil inlet through the saddle bearing surface;
   forming at least one oil outlet in the upper wall of the lower crown;
   forming the lower crown having an annular lower outer wall portion and an annular lower inner wall portion extending upwardly from the upper wall;
   fixing the upper and lower outer annular wall portions to one another and fixing the upper and lower inner annular wall portions to one another and forming a toroid-shaped outer cooling gallery surrounding an inner cooling gallery;
   fixing an end of a connecting rod to the wrist pin for conjoint oscillation therewith and bringing an oil passage in the connecting rod into fluid communication with a through hole in the wrist pin; and
   configuring the through hole in the wrist pin for fluid communication with the at least one oil inlet in the upper wall during reciprocation of the wrist pin against the saddle bearing surface.

2. The method of claim 1 further including configuring the through hole in the wrist pin for intermittent fluid communication with the at least one oil inlet in the upper wall during reciprocation of the wrist pin against the saddle hearing surface.

3. The method of claim 1 further including orienting the at least one oil outlet to direct oil directly onto an outer surface of the wrist pin.

4. The method of claim 3 further including aligning the at least one oil outlet in substantially tangent relation to an outer surface of the wrist pin.

5. The method of claim 1 further including forming the at least one oil outlet as a pair of oil outlets on opposite sides of the pin bore axis from one another.

6. The method of claim 1 further including forming the at least one oil inlet along a central longitudinal axis along which the piston reciprocates.

7. The method of claim 1 further including forming a plurality of radially extending reinforcement ribs along the undercrown surface within the outer cooling gallery.

8. The method of claim 7 further including forming reinforcement ribs along the undercrown surface within the inner cooling gallery.

9. The method of claim 1 further including joining the upper crown and the lower crown to one another via friction welding or induction welding.

10. The method of claim 1 further including forming the upper crown and the lower crown as a monolithic piece of material in a casting process.

\* \* \* \* \*